(12) United States Patent
Lee et al.

(10) Patent No.: US 10,060,810 B2
(45) Date of Patent: Aug. 28, 2018

(54) APPARATUS FOR SENSING OPERATION OF AIR CUSHION AND METHOD THEREFOR

(71) Applicant: KOREA INSTITUTE OF INDUSTRIAL TECHNOLOGY, Cheonan-si (KR)

(72) Inventors: Suwoong Lee, Daegu (KR); Soono Kwon, Andong-si (KR); Youngjin Kim, Cheonan-si (KR)

(73) Assignee: Korea Institute of Industrial Technology, Cheonan-si (KR)

( * ) Notice: Subject to any disclaimer, the term of this patent is extended or adjusted under 35 U.S.C. 154(b) by 169 days.

(21) Appl. No.: 14/772,056

(22) PCT Filed: Mar. 13, 2014

(86) PCT No.: PCT/KR2014/002148
§ 371 (c)(1),
(2) Date: Sep. 1, 2015

(87) PCT Pub. No.: WO2014/142596
PCT Pub. Date: Sep. 18, 2014

(65) Prior Publication Data
US 2016/0018279 A1    Jan. 21, 2016

(30) Foreign Application Priority Data

Mar. 13, 2013  (KR) ........................ 10-2013-0026570

(51) Int. Cl.
*G01L 5/16*   (2006.01)
*G01B 11/16*  (2006.01)
(Continued)

(52) U.S. Cl.
CPC ................ *G01L 5/16* (2013.01); *G01B 11/16* (2013.01); *G01B 13/24* (2013.01); *G01L 1/00* (2013.01); *G01L 1/02* (2013.01)

(58) Field of Classification Search
None
See application file for complete search history.

(56) References Cited

U.S. PATENT DOCUMENTS

| 6,058,537 | A  | * | 5/2000 | Larson | A47C 27/082 5/710 |
| 6,253,401 | B1 | * | 7/2001 | Boyd   | A47C 27/082 5/710 |

(Continued)

FOREIGN PATENT DOCUMENTS

| JP | 2009-119230 A | 6/2009 |
| JP | 2009-285737 A | 12/2009 |
| JP | 2010-046141 A | 3/2010 |

*Primary Examiner* — Michael Lebentritt
(74) *Attorney, Agent, or Firm* — Drinker Biddle & Reath LLP

(57) ABSTRACT

An apparatus for sensing the operation of an air cushion includes an air cushion with the inside provided with a plurality of patterns filled with air; a part for sensing the air pressure inside the air cushion so as to output a corresponding air pressure sensing signal; a part for sensing the temperature inside the air cushion so as to output a corresponding temperature sensing signal; a photographic part arranged in the lower part of the air cushion for photographing the plurality of patterns so as to output an image of each pattern; and a control unit for determining the air pressure inside the air cushion by measuring the force exerted on the air cushion in the Y-direction based on the temperature, air pressure and contact area, and by measuring the force exerted on the air cushion in the X-direction based on the displacement of the contact area.

9 Claims, 10 Drawing Sheets

(51) Int. Cl.
*G01B 13/24* (2006.01)
*G01L 1/02* (2006.01)
*G01L 1/00* (2006.01)

(56) References Cited

U.S. PATENT DOCUMENTS

| | | | | |
|---|---|---|---|---|
| 6,269,505 | B1* | 8/2001 | Wilkinson | A47C 27/084 5/654 |
| 6,299,250 | B1* | 10/2001 | Orizaris | B60N 2/0228 297/284.6 |
| 7,424,355 | B2* | 9/2008 | Molitor | B60N 2/0244 177/136 |
| 7,774,881 | B2* | 8/2010 | Friedrichs | A47C 27/082 5/710 |
| 8,868,244 | B2* | 10/2014 | Genaro | A47C 27/10 5/655.3 |
| 9,005,101 | B1* | 4/2015 | Van Erlach | A61B 17/22004 600/9 |
| 9,090,185 | B2* | 7/2015 | McMillen | B60N 2/4838 |
| 9,271,578 | B2* | 3/2016 | Choi | A47C 27/083 |
| 9,408,477 | B1* | 8/2016 | Robinson | A47C 27/082 |
| 9,552,460 | B2* | 1/2017 | Riley | A61B 5/02055 |
| 9,591,995 | B2* | 3/2017 | Blumberg | A47C 23/002 |
| 2009/0076772 | A1 | 3/2009 | Hinshaw et al. | |
| 2010/0117414 | A1* | 5/2010 | Hwang | B60N 2/4415 297/217.3 |
| 2011/0252895 | A1* | 10/2011 | Kiesbauer | F16K 37/0091 73/862.583 |

* cited by examiner

US 10,060,810 B2

APPARATUS FOR SENSING OPERATION OF AIR CUSHION AND METHOD THEREFOR

CROSS-REFERENCE TO RELATED APPLICATIONS

This application is the U.S. national phase of International Patent Application No. PCT/KR2014/002148 filed Mar. 13, 2014, which claims the benefit of Korean Patent Application No. 10-2013-0026570 filed Mar. 13, 2013, the entire content of which is incorporated herein by reference.

FIELD

Disclosed herein is an apparatus and method for sensing an operation of an air cushion.

BACKGROUND

Generally, force sensors are used for measuring a pressure applied from the outside of an object.

A force sensor directly converts a force applied from the outside to an electrical signal having the magnitude corresponding to the applied force and outputs the electrical signal.

In a conventional force sensor, a part contacted by a user is formed of a rigid material such as a metal, which feels unpleasant to touch. In order to improve the feeling of the force sensor upon being touched, the part contacted by the user is typically covered with a soft material such as polyurethane.

However, due to softness of this soft material and increase in thickness of the force sensor, the sensitivity of the force sensor decreases to degrade the performance of the force sensor.

SUMMARY

Keeping in mind the above problems occurring in the prior art, embodiments disclosed herein provide an apparatus and method for sensing an operation of an air cushion capable of accurately sensing an operation state of the air cushion and improving user's convenience.

An embodiment provides an apparatus for sensing an operation of an air cushion. The apparatus comprises an air cushion, an inside of which is filled with air and has a plurality of patterns arrayed on an inner surface thereof; a pneumatic pressure sensor sensing a pneumatic pressure in the air cushion to output a corresponding pneumatic pressure sensing signal; a temperature sensor sensing a temperature in the air cushion to output a corresponding temperature sensing signal; a capturing unit positioned in a bottom portion of the air cushion, capturing the plurality of patterns, and outputting a pattern image for each captured pattern; and a controller connected to the pneumatic pressure sensing unit, temperature sensing unit, and capturing unit, determining the pneumatic pressure in the air cushion by using the pneumatic sensing signal, determining the temperature in the air cushion by using the temperature sensing signal, comparing the captured pattern image with an initial pattern image to determine an area of a contact surface between the air cushion and a pressure applying unit, and movement amounts in X- and Y-directions, determining a magnitude of a force applied to the air cushion in the Y-direction by using the determined temperature, pneumatic pressure, and area of the contact surface, and determining a magnitude of a force applied to the air cushion in the X-direction by using the determined movement amount of the contact surface.

The magnitude Fv(t) of the force applied in the Y-direction may be calculated with the following equation, $$Fv(t) = (Pa(t) - Po)Sa - Ka(Pa(t), Sh(t))\frac{R}{Sa}\frac{Ta(t)}{Pa(t)}$$

$$R = \frac{PoVo}{To}$$

where Pa(t) denotes the determined pneumatic pressure, Po denotes the initial pneumatic pressure, Sa denotes a bottom portion area of the air cushion, Ka denotes a hypothetical elastic element in a cylinder piston model, Sh(t) denotes the area of the contact surface of the air cushion, and Ta(t) denotes the determined temperature of the air cushion.

The apparatus may further comprise a thermal sensor or contact sensor positioned in the air cushion, wherein the controller calculates the area of the contact surface by using a signal output from the thermal sensor or the contact sensor.

The magnitude Fh(t) of the force applied in the X-direction may be calculated with the following equation, $$Fh(t)=a_5\Delta X(t)^2+a_4\Delta Y(t)^2+a_3\Delta X(t)\Delta Y(t)+a_2\Delta X(t)+a_1\Delta Y(t)+a_0$$

where a1, a2, a3, a4, and a5 are coefficients determining elasticity of a material forming the air cushion, and are constants, Δx denotes a movement amount in a horizontal direction, and Δy denotes a movement amount in a vertical direction.

The controller calculates a position X(t) on an X-coordinate and a position Y(t) on a Y-coordinate of each pattern with the following Equation, $$X(t) = \frac{d}{a(t)}x(t)$$

$$Y(t) = \frac{d}{a(t)}L$$

where d denotes an initial diameter of each pattern, a(t) denotes a magnitude of a major axis on an captured pattern image of each pattern, and L denotes a focal length, calculates an average value of the X-coordinate positions for the plurality of patterns and an average value of the Y-coordinate positions for the plurality of patterns as a current coordinate value of the current contact surface, and calculates a difference between the current coordinate value and a previously calculated coordinate value for the contact surface to calculate the movement amount (ΔX, ΔY) in the X- and Y-directions of the contact surface.

In order to accomplish the above object, the present disclosure provides a method for sensing an operation of an air cushion. The method comprises measuring pneumatic pressure in the air cushion; measuring a temperature in the air cushion; obtaining a pattern image for each of a plurality of patterns arrayed in the air cushion; comparing the obtained pattern image with an initial pattern image to determine an area of a contact surface between the air cushion and a pressure applying unit, which applies pressure to an outer side of the air cushion, and movement amounts in X- and Y-directions; determining a magnitude of a force applied to the air cushion in the Y-direction by using the determined temperature, pneumatic pressure, and area of the contact surface; and determining a magnitude of a force applied to the air cushion in the X-direction by using the determined movement amount of the contact surface.

Determining a magnitude of a force applied to the air cushion in the Y-direction may include calculating the magnitude Fv(t) of the force applied in the Y-direction with the following equation, $$Fv(t) = (Pa(t) - Po)Sa - Ka(Pa(t), Sh(t))\frac{R}{Sa}\frac{Ta(t)}{Pa(t)}$$

$$R = \frac{PoVo}{To}$$

where Pa(t) denotes the determined pneumatic pressure, Po denotes the initial pneumatic pressure, Sa denotes a bottom portion area of the air cushion, Ka denotes a hypothetical elastic element in a cylinder piston model, Sh(t) denotes the area of the contact surface of the air cushion, and Ta(t) denotes the determined temperature of the air cushion.

The determining a magnitude of a force applied to the air cushion in the X-direction may include calculating the magnitude Fv(t) of the force applied in the Y-direction with the following equation, $$Fh(t) = a_5\Delta X(t)^2 + a_4\Delta Y(t)^2 + a_3\Delta X(t)\Delta Y(t) + a_2\Delta X(t) + a_1\Delta Y(t) + a_0$$

where a1, a2, a3, a4, and a5 are coefficients determining elasticity of a material forming the air cushion, and are constants, Δx denotes a movement amount in a horizontal direction, and Δy denotes a movement amount in a vertical direction.

Determining a magnitude of a force applied to the air cushion in the X-direction may further include: calculating a position X(t) on an X-axis coordinate and a position Y(t) on a Y-axis coordinate of each pattern with the following Equation, $$X(t) = \frac{d}{a(t)}x(t)$$

$$Y(t) = \frac{d}{a(t)}L$$

where d denotes an initial diameter of each pattern, a(t) denotes a magnitude of a major axis on an obtained pattern image of each pattern, and L denotes a focal length, calculating an average value of the X-coordinate positions for the plurality of patterns and an average value of the Y-coordinate positions for the plurality of patterns as a current coordinate value of the current contact surface, and calculating a difference between the current coordinate value and a previously calculated coordinate value for the contact surface to calculate the movement amount (ΔX, ΔY) in the X- and Y-directions of the contact surface. According to the embodiments disclosed herein, a direction in which a force is applied to an air cushion filled with air, and the magnitude thereof can be accurately determined. Since the operation state of the air cushion is accurately determined, an operation of a desired object can be accurately and rapidly determined by using the air cushion to improve user convenience.

DETAILED DESCRIPTION

Figure 1:
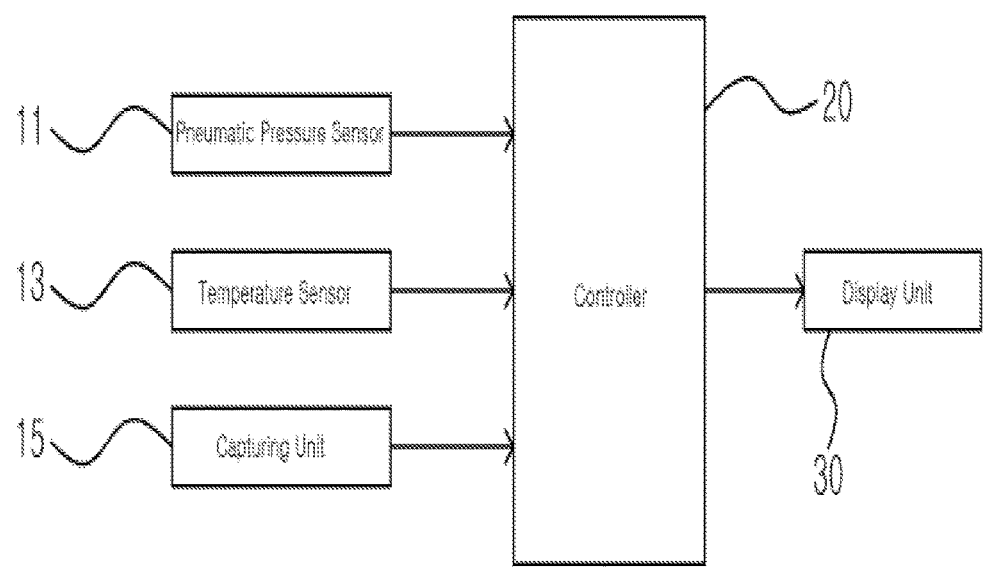
FIG. 1 is a block diagram of an apparatus for sensing an operation of an air cushion according to an embodiment of the present disclosure.

Reference should now be made to the drawings, in which the same reference numerals are used throughout the different drawings to designate the same or similar components.

Hereinafter, embodiments of the present disclosure will be described in detail with reference to the accompanying drawings so that it can be easily realized by those skilled in the art. However, the present disclosure can be practiced in various ways and is not limited to the embodiments described herein. In the drawings, parts which are not related to the description are omitted to clearly set forth the present disclosure and similar elements are denoted by similar reference symbols throughout the specification.

An apparatus and method for sensing an operation of an air cushion according to an embodiment of the present disclosure will be described with the accompanying drawings.

First, an apparatus and method for sensing an operation of an air cushion according to an embodiment of the present disclosure will be described with reference to FIGS. 1 and 2.

Figure 2:
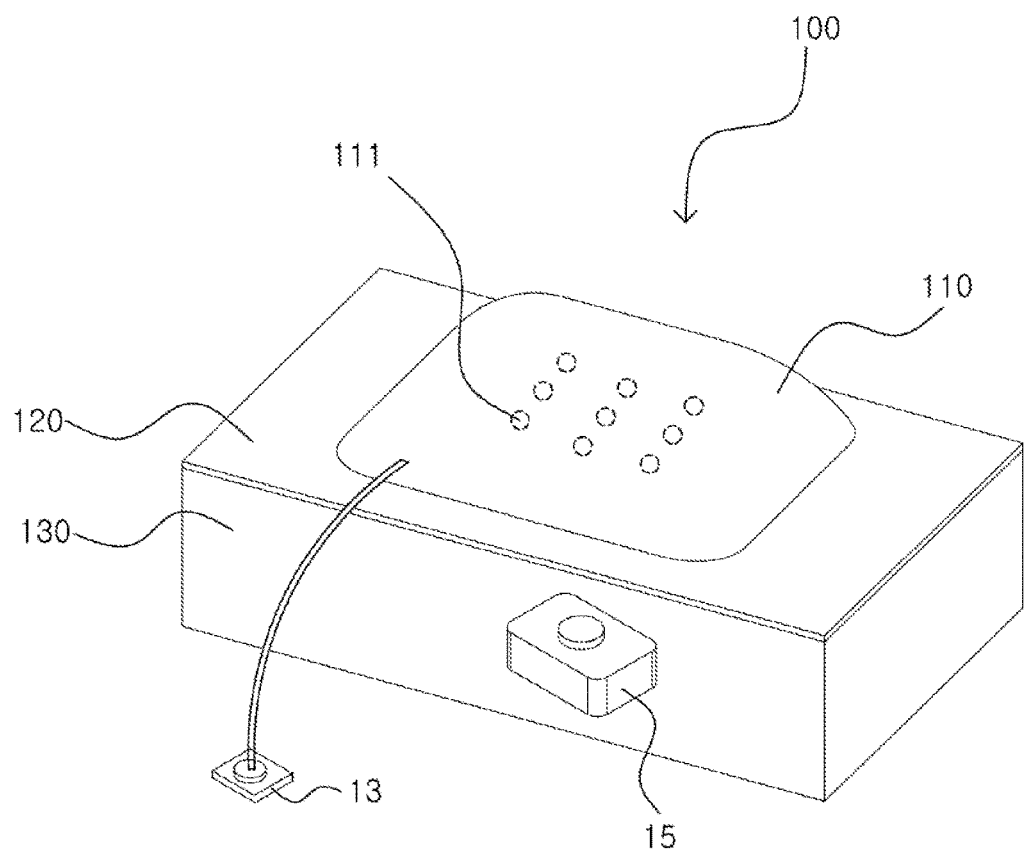
FIG. 2 schematically illustrates an air cushion device according to an embodiment.

Referring to FIGS. 1 and 2, an apparatus for sensing an operation of an air cushion according to an embodiment comprises an air cushion device 100 comprising an air cushion 110, a pneumatic pressure sensor 11 sensing an air pressure (i.e. a pneumatic pressure) in the air cushion 110 to output a signal of a corresponding state, a temperature sensor 13 sensing a temperature in the air cushion 110 to output a signal of a corresponding state, a capturing unit 15 capturing a pattern 111 formed in the air cushion 110 to output a captured image, and a controller 20 connected to the pneumatic pressure sensor 11, the temperature sensor 13, and the capturing unit 15.

Referring FIG. 2, the air cushion device 100, as described above, comprises a transparent substrate 120 including the air cushion 110 and is positioned under the air cushion 110, and a prop 130 positioned under the transparent substrate 120.

The air cushion 110 includes an enclosed space 110 filled with air and is formed of a material having elasticity that, according to how deeply the outer surface of the air cushion 110 exposed to the outside is pressed, is determined according to the magnitude of the pressure applied from the outside.

As illustrated in FIG. 2, the air cushion 110 has the top portion covered with a corresponding material and the bottom portion opened.

The air cushion 110 may be formed of a flexible material, such as a rubber material, stretching and contracting according to the pressure applied from the outside.

The inner surface (i.e. the top inner surface oppositely positioned to the outer surface) of the air cushion 110 comprises a plurality of patterns 111, which are separately arrayed horizontally and vertically at a predetermined interval. In the embodiment, even though 9 patterns 111 arrayed in a 3×3 matrix structure are included, the number and interval of the patterns 111 positioned on the inner surface of the air cushion 110 may be adjusted as necessary.

At this point, each pattern 111 is formed of a color contrasted with that of the air cushion 10 to allow changes in shape and size of each pattern 111 to be more easily distinguished in an image captured by the capturing unit 15, and for example, each pattern 111 may be formed in a white color.

In addition, a change in size may be easily determined according to a change in pressure applied from the outside by making a shape of each pattern 111 into a circle.

The transparent substrate 120 adjoins the bottom portion of the air cushion 110 to completely cover the opened bottom portion and accordingly the air cushion 110 has a structure enclosed by the transparent substrate 120.

The plurality of patterns 111 positioned on the inner surface of the air cushion 110 is exposed externally through the transparent substrate 120.

The transparent substrate 120 is formed of a transparent material such as plastic or glass.

The prop 130 is positioned directly under the transparent substrate 120 and supports the transparent substrate 120 on which the air cushion 110 is positioned.

A vacant space exists in the prop 130 and the capturing unit 15 is positioned in the space.

At this point, the capturing unit 15 is positioned to correspond to the plurality of patterns 111 and captures the patterns 111 that change according to the pressure applied from the outside to the air cushion 110 and are visible externally through the transparent substrate 120.

The temperature sensor 13 is positioned in the air cushion 110 to sense a temperature in the air cushion 110 and outputs a temperature sensing signal corresponding to the sensed temperature.

The capturing unit 15, as the foregoing, is embedded in the prop 130 to capture the plurality of patterns 111 changing according to an external pressure and to output the captured image to the controller 20.

The controller 20 determines forces horizontally and vertically applied to the air cushion 110 by using the signals and image output from the pneumatic pressure sensor 11, the temperature sensor 13, and the capturing unit 15.

The direction (i.e. horizontal or vertical direction) and magnitude of the force applied to the air cushion 110 are determined without using an expensive force sensor.

Figure 3:
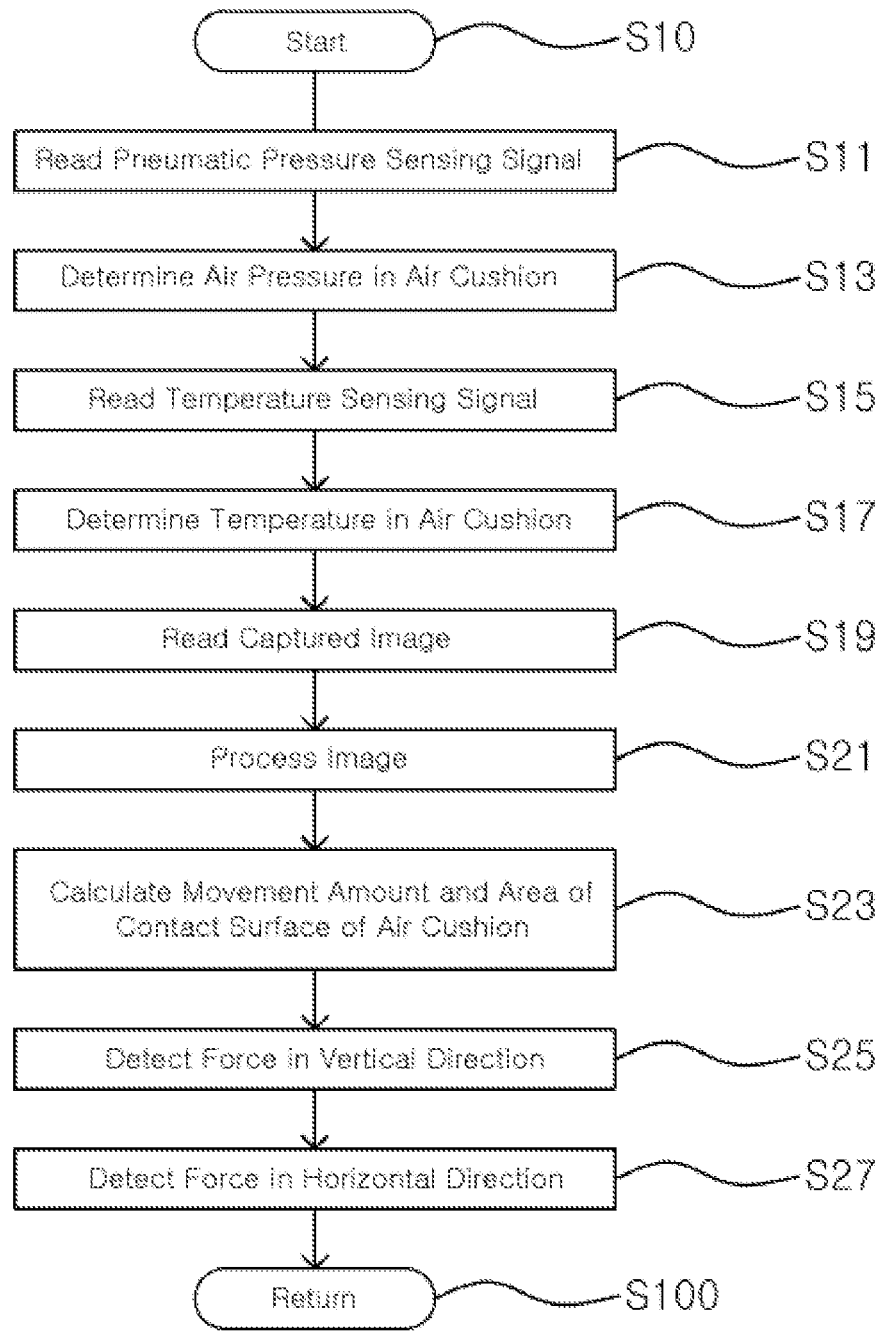
FIG. 3 is an operation flow chart of an apparatus for sensing an operation of an air cushion according to an embodiment.

Next, a description will be provided about an operation of the apparatus for detecting the operation of the air cushion with reference to FIG. 3.

First, when the operation starts (operation S10), the controller 20 reads the pneumatic pressure sensing signal output from the pneumatic pressure sensor 11 (operation S11) and determines an internal pneumatic pressure in the air cushion 110 (operation S13).

Then, the controller 20 reads the temperature sensing signal output from the temperature sensor 13 (operation S15) and determines a temperature in the air cushion 110 (operation S17).

In addition, the controller 20 reads the image output from the capturing unit 15 (operation S19) and performs a pattern image processing operation on the image (operation S21). At this point, an image signal corresponding to the captured image may be transmitted from the capturing unit 15 to the controller 20 through a universal serial bus.

Due to the pattern image processing operation, the controller 20 executes a binary process for converting a color image, which is obtained by removing a noise component included in the image transmitted from the capturing unit 15, to a binary image (e.g. an image having white patterns on black background), and performs a contour process on each pattern image in which each pattern 111 is captured by using the obtained binary image signal to determine the shape of the pattern image. At this point, the contour process for each pattern image may be performed by using an application programming interface (API) of an open source computer vision library (Open-CV).

Then, the controller 20 determines the center point of each pattern image to obtain coordinates of the center point therein, and executes a pattern image process for determining magnitudes of a major axis and minor axis of each pattern by using the center point coordinates and the shape of each pattern image.

Then, the controller 20 calculates a movement amount ($\Delta X$, $\Delta Y$) in an X-direction (i.e. a plane direction) and a Y-direction (i.e. a depth direction) by using data of the contacting surface calculated in the previous operation, and calculates an area of the contacting surface with a pressure applying unit such as a finger contacting the outer surface of the top portion of the air cushion 110 in order to press the air cushion 110 (operation S23).

Then, a description will be provided about a method for calculating a movement amount $\Delta X$ in the X-direction and a movement amount $\Delta Y$ in the Y-direction.

Figure 4A:
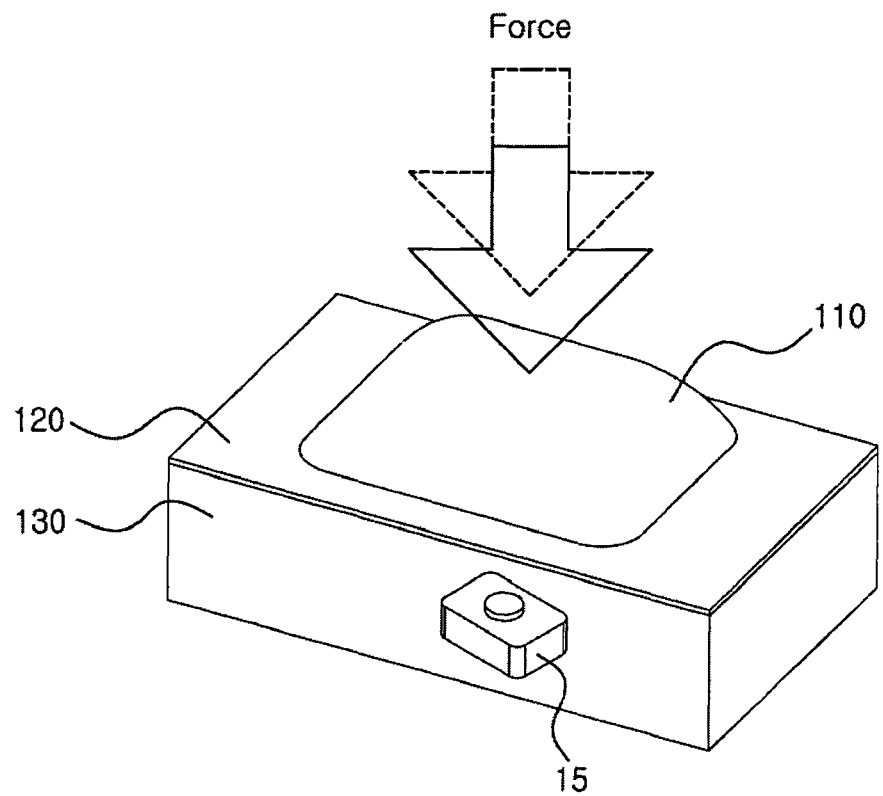
FIG. 4A schematically illustrates a state change of an air cushion and FIG. 4B schematically illustrates changes of a plurality of patterns inside the air cushion, when a force is vertically applied to the air cushion according to an embodiment.

As illustrated in FIG. 4A, when force is applied to the air cushion 110 in the Y-direction that is a vertical direction, the surface of the air cushion 110 is pressed to cause a movement of the pattern 111 positioned on the inner surface of the top portion of air cushion 110.

The plurality of patterns 111 attached on the top inner surface of the air cushion 110 vertically fall and the top inner surface of the air cushion 110 moves toward the capturing unit 15 positioned in the prop 130.

Figure 4B:
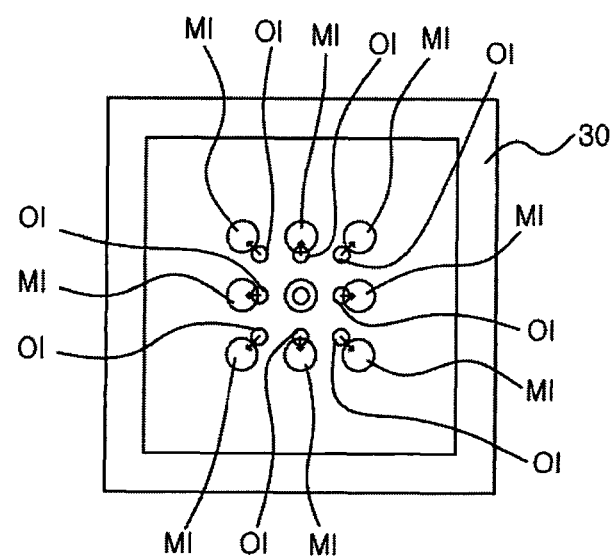

In addition, since the air cushion 110 is formed of a rubber material having flexibility, the top inner surface is stretched with the applied pressure and positions of the patterns 111 also move towards edges of the air cushion 110, namely, in all directions as illustrated with arrows in FIG. 4B.

Compared with an initial image of each pattern 111, namely, initial pattern image OI captured in an initial state before the air cushion 110 is pressed, when the air cushion 110 is pressed, the size of the pattern image MI captured by the capturing unit 15 and displayed on the display unit 30 increases and a distance between adjacent pattern images MI also increases.

Figure 5A:
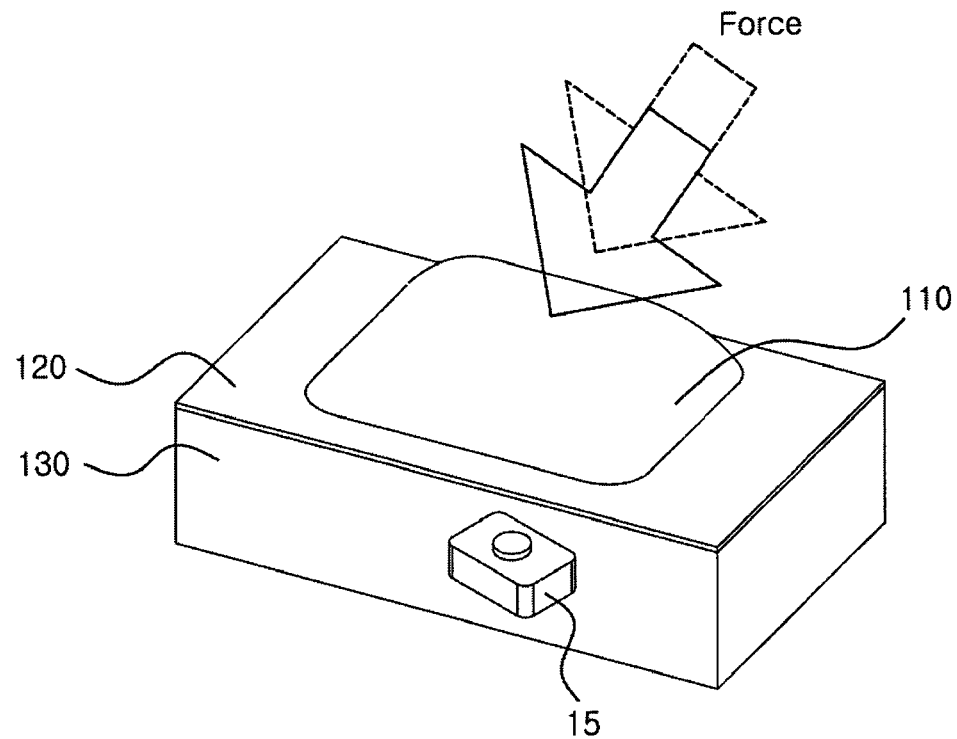
FIG. 5A schematically illustrates a state change of an air cushion and FIG. 5B schematically illustrates changes of a plurality of patterns inside the air cushion, when a force is horizontally applied to the air cushion according to an embodiment.
Figure 5B:
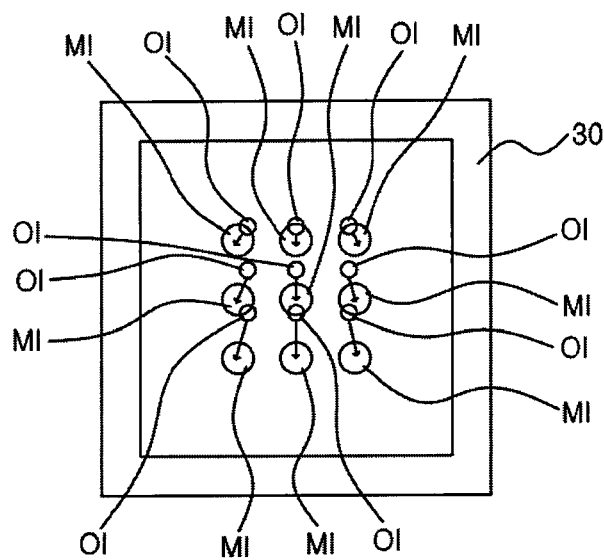

In addition, as illustrated in FIG. 5A, when a force is applied to a side surface of the air cushion 110, which intersects with the vertical direction, each pattern 110 attached to the top inner surface of the air cushion 110 moves in a force-applied direction like arrows illustrated in FIG. 5B, for example, at least one of left, right, forward, and backward directions and at the same time vertically falling. In this case, the surface of the air cushion 110 increases, the size of each pattern 111 and an interval between adjacent patterns 111 are different from those in the initial state.

In the example, it is assumed that moving the position of each pattern 111 in one of left, right, forward, and backward directions on a plane is moving in the X-direction, and the direction and magnitude of a force applied at this time are called direction and magnitude of the force applied in a horizontal direction.

When a force is applied to a side surface of the air cushion 110, each pattern 111 moves in the X-direction.

Compared with each initial pattern image OI captured in the initial state, the position on the plane of the pattern image MI, which is obtained by the capturing unit 15 when the force is applied to the side surface and displayed on the display unit 30, is moved in a corresponding direction and the size of the pattern image MI also increases.

The controller 20 compares the pattern image captured through the capturing unit 15 with the initial pattern image to determine a movement direction and movement amount of each pattern 110.

Figure 6:
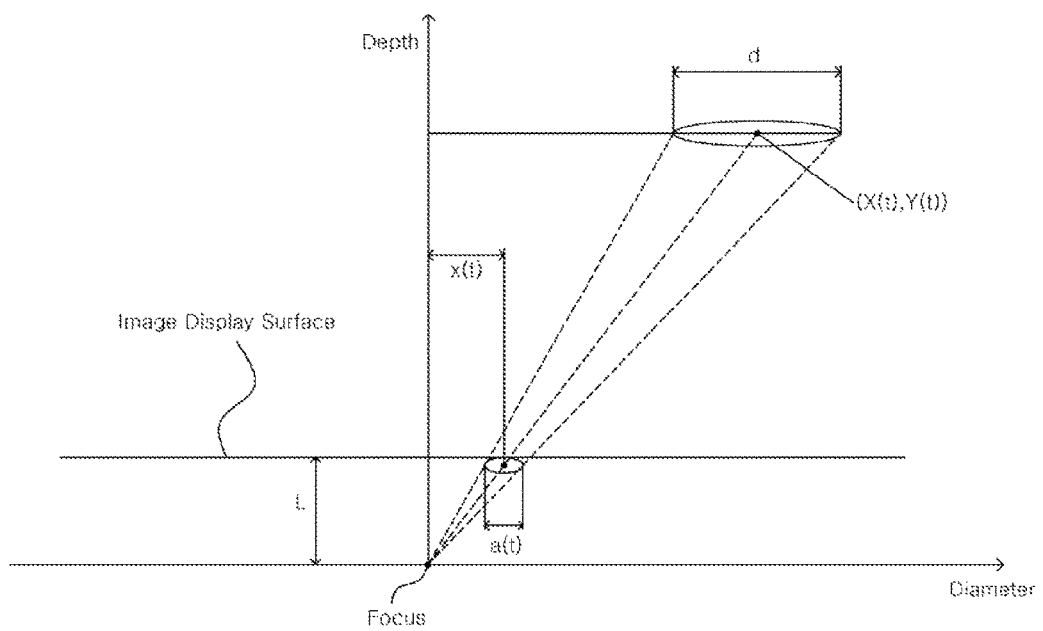
FIG. 6 illustrates a relationship between an actual pattern position on the inner surface of the air cushion and a length of a major axis of a pattern image displayed on a display unit.

FIG. 6 illustrates a relationship between an actual position of the pattern 110 on the inner surface of the air cushion 110 and the length of the major axis of a pattern image displayed on the display unit 30 (i.e. image display surface).

On the basis of the graph shown in FIG. 6, the following Equation (1) is obtained, and a position X(t) on an X-coordinate and a position Y(t) on a Y-coordinate of each pattern positioned in an actual space (i.e. the inner surface of the air cushion 110) are calculated according to Equations (2) and (3) using Equation (1).

$$d:a(t) = X(t):x(t) = Y(t):L \quad (1)$$

$$X(t) = \frac{d}{a(t)} x(t) \quad (2)$$

$$Y(t) = \frac{d}{a(t)} L \quad (3)$$

Here, d denotes an initial diameter (i.e. diameter of each pattern 110 in the initial state where a pressure is not applied to the top surface of the air cushion by the pressure applying unit), a(t) denotes the magnitude of the major axis on each obtained pattern image, and L denotes a focal length.

Thus, when a position X(t) on an X-coordinate and a position Y(t) on a Y-coordinate of each of the plurality of patterns 111 are calculated in the current operation, an average value of the positions X(t) on the X-coordinate and an average value of the positions Y(t) on the Y-coordinate of the plurality of patterns 111 are calculated as a current coordinate value [X(t), Y(t)] for a currently contacting surface.

Then, a difference between the current coordinate value [X(t), Y(t)] and previous coordinate value [X(t)', Y(t)'], which is calculated in a previous operation for the contacting surface, is calculated, and a current movement amount (ΔX, ΔY) in the X- and Y-directions, namely, a coordinate value change amount ΔX on the X-axis and a coordinate value change amount ΔY on the Y-axis for the contacting surface are calculated.

Thus, the controller 20 determines a current state of the air cushion 110 by using the signals and image output from the pneumatic pressure sensor 11, the temperature sensor 13, and the capturing unit 15.

The controller 20 includes a storage unit (not illustrated) and stores a position of the contact surface, a previous position [X(t)', Y(t)'] and previous movement amount (ΔX', ΔY') with respect to the contacting surface, which are calculated in the previous operations.

Then, the controller 20 calculates the area of the contacting surface where the outer surface of the air cushion 110 contacts the pressure applying unit by using the movement amount (ΔX, ΔY) of each pattern, and lengths of the major and minor axes of each pattern 111.

Figure 7A:
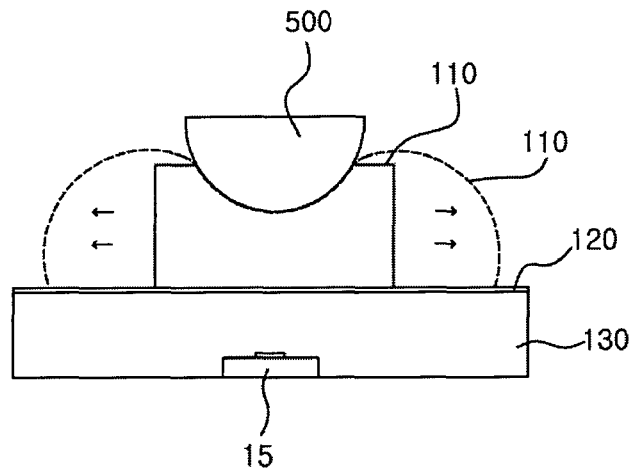
FIG. 7A illustrates a change in shape of an air cushion and FIG. 7B illustrates a position change of a pattern according to the change in shape of the air cushion, when a pressure applying unit is positioned on the air cushion according to an embodiment.

In other words, when the air cushion 110 is pressed by the pressure applying unit 500, as illustrated in FIG. 7A, a part of the air cushion 110, which contacts the pressure applying unit 500, is a lowest part positioned most closely to the capturing unit 15, and the periphery of the lowest part is raised upwardly by a balloon effect to be a highest part positioned most distantly from the capturing unit 15.

Figure 7B:
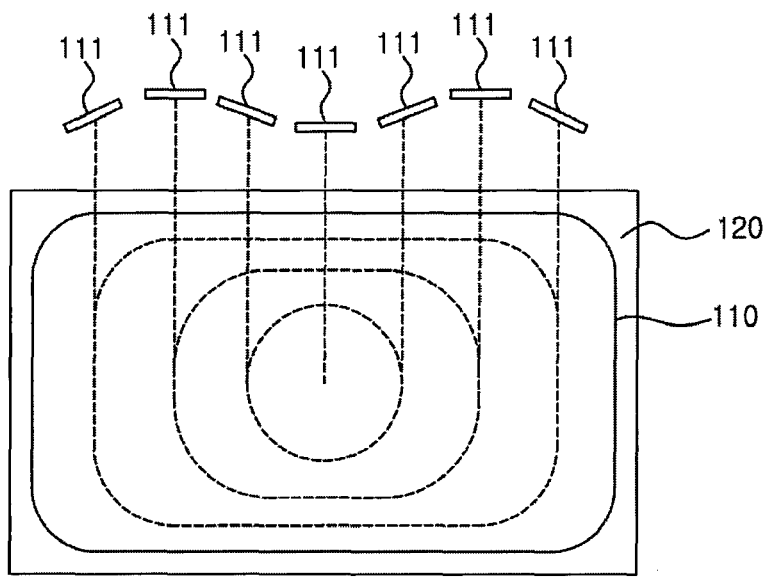

As illustrated in FIG. 7B, when the plurality of patterns 111 arrayed on the inner surface of the air cushion 110 is viewed from the side surface, a part where the pressure applying unit 500 contacts is a lowest part and the periphery of the pressure applying unit 500 rises like a ridge.

In addition, a part where the pressure applying unit 500 is positioned, namely, the pattern 111 existing at a reference position has a shape of a circle, which is an initial shape, or close to a circle, but the patterns 111 positioned around the pressure applying unit 500 have shapes changed from the circle to an ellipse by the balloon effect.

However, the part having the ridge shape becomes again to have a shape close to a circle, which is an initial shape of the pattern 111.

As going from the reference position to the part having the ridge shape, an ellipse ratio (i.e. length of minor axis/length of major axis of each pattern) decreases, so that the ellipse ratio of a pattern positioned right ahead of the pattern positioned at the part having the ridge shape may be the minimum.

On the basis of this, a contact area of the pressure applying unit 500 may be schematically estimated as a part surrounded by the ridge part, wherein the part has the reference position at which the pressure applying unit 500 is positioned as the center.

In this embodiment, the contact area of the pressure applying unit 500 is estimated as the area of a part formed of a pattern having a smallest ellipse ratio (i.e. length d2 of minor axis/length d1 of major axis of each pattern) on the basis of a pattern most deeply pressed from a reference pattern, namely, the reference position.

Figure 8A:
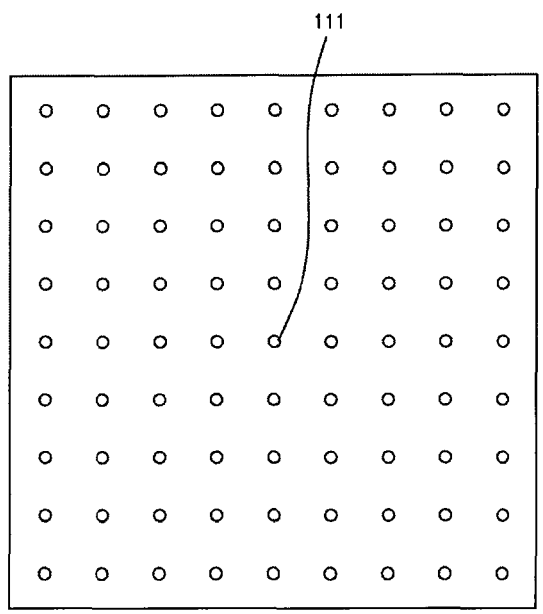
FIG. 8A illustrates an initial shape of a pattern positioned on the inner surface of the air cushion when the pressure applying unit is not positioned on the air cushion.

For example, it is assumed that there are the plurality of patterns 111 having the circle shape on the inner surface of the air cushion 110 as illustrated in FIG. 8A.

At this point, when the air cushion 110 having a pattern shape as illustrated in FIG. 8A is pressed by the pressure applying unit and a reference pattern image 111a is formed from among a plurality of pattern shapes (FIG. 8B) captured by the capturing unit 15 according to the position of the pressure applying unit, a plurality of pattern images positioned around the reference pattern image 111a are changed to elliptical pattern images 111b and accordingly the ellipse ratio of this pattern image 111b is reduced than that in the initial state (i.e. circular pattern image). However, a part separated by a certain distance from the reference pattern image 111a, namely, a pattern image positioned at the ridge part becomes a pattern image 111c close to the circle again and the ellipse ratio of the pattern image 111c is increased.

The controller 20 determines the reference pattern image 111a by using each pattern image captured by the capturing unit 15, and determines the elliptical pattern image 111b having a minimum ellipse ratio on the basis of the reference pattern image 111a. At this point, when the ellipse ratio of the measured elliptical pattern image 111b is in a range determined [minimum ellipse ratio±valid value α] in consideration of the valid value a in addition to the minimum ellipse ratio, it is considered to have the identical minimum ellipse ratio.

Figure 8B:
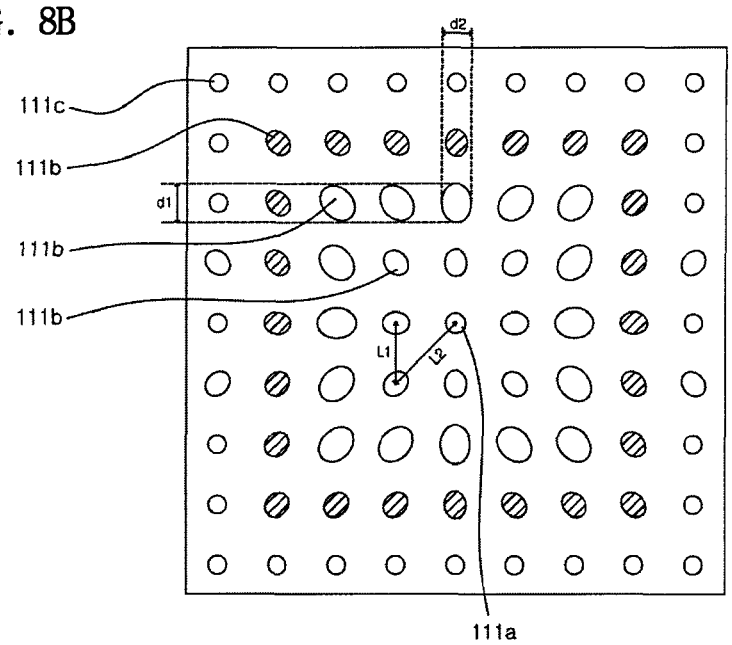
FIG. 8B illustrates a changed shape of the pattern when the pressure applying unit is positioned on the air cushion.
Figure 9A:
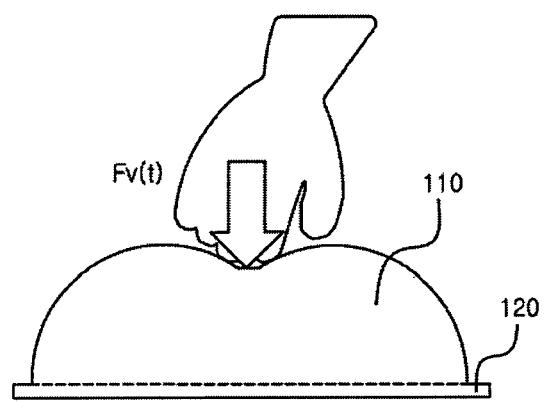
FIG. 9A schematically illustrates a state change of an air cushion and FIG. 9B illustrates the state change in FIG. 9A as a piston cylinder model, when a force is vertically applied to the air cushion according to an embodiment.
Figure 9B:
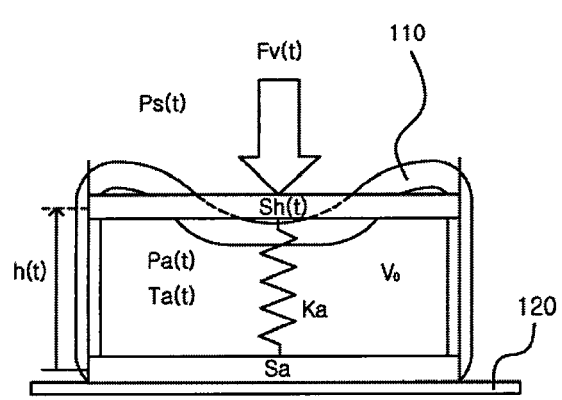
Figure 10:
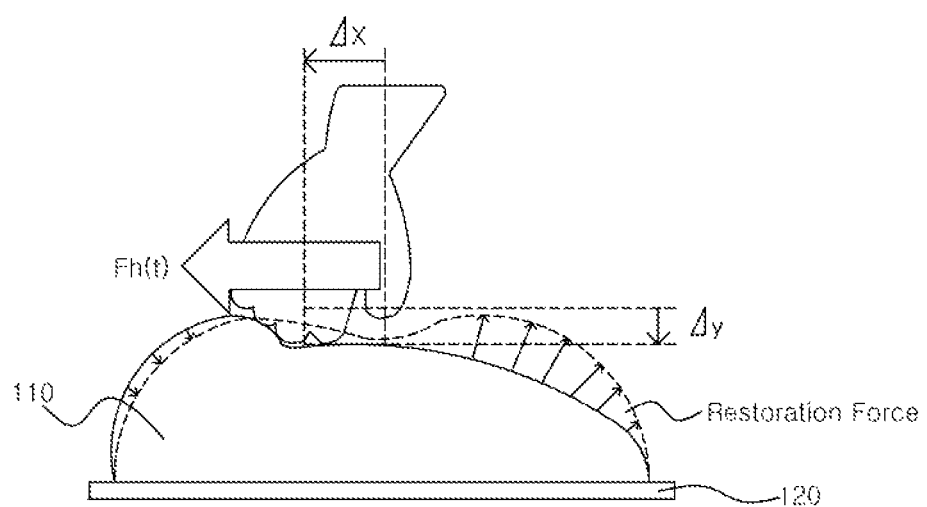
FIG. 10 illustrates a state change of an air cushion when a force is vertically applied thereto according to an embodiment.

Then, the area of a part surrounded with the elliptical pattern image 111b (i.e. a part surrounded with the slashed pattern image 111b in FIG. 8B) is measured, and the contact area between the pressure applying unit and air cushion 110 is calculated. As described above, the controller 20 may obtain X- and Y-coordinates for each of pattern images 111a, 111b, and 111c, and may also measure distances d1 and d2 between the reference pattern image 111a and elliptical pattern image 111b, thus calculating the contact area by using the measured distance.

In addition, the controller 20 may apply a correction value to the measured area and improve reliability of the contact area. At this point, the correction value may be calculated on the basis of a difference between the actual inner surface area of the air cushion 110 and the inner surface area of the captured image when the inner surface is captured by the capturing unit 15 and displayed in a plane.

However, in an alternative embodiment, the controller 20 may calculate the area of the contact surface between the pressure applying unit and the air cushion 110 by using a separate sensor such as a thermal sensor or contact sensor on the top surface of the air cushion 110.

At this point, the thermal sensor outputs a thermal sensing signal corresponding to a detected heat and allows the area of the contact surface to be calculated by using a thermal sensing signal distribution, and the contact sensor may output a contact sensing signal by using a sensor whose output signal changes according to whether a force is applied.

As described above, when the position of the contact surface, and the position (X(t), Y(t)) and movement amount (ΔX, ΔY) with respect to the contact surface are calculated in the current operation, the controller 20 stores the currently calculated position of the contact surface, and the currently calculated position (X(t), Y(t)) and movement amount (ΔX, ΔY) with respect to the contact surface as the previous position of the contact surface, and the previous position (X(t)', Y(t)') and movement amount (ΔX', ΔY') with respect to the contact surface.

At this point, an operation sequence of the pneumatic pressure determining operation and the temperature sensing operation is changeable, and an operation sequence of the contact surface area determining operation and movement amount determining operation is also changeable, Then, the controller 20 may determine the magnitude of the force vertically applied by using the determined pneumatic pressure, temperature, and contact surface area (operation S25).

As illustrated in FIG. 7A, when the force Fv(t) is vertically applied to the air cushion 110 by the pressure applying unit such as a user' hand, a coefficient employed in the air cushion 110 may be expressed as a cylinder piston model as illustrated in FIG. 7B.

When the Pascal's principle and Hooke's law are applied to the physical model illustrated in FIG. 4B, the following Equations (4) and (5) are obtained.

$$Pa(t)Sa = Ps(t)Sa + f_{ko} + Ka(t)h(t) + Fv(t) \quad (4)$$

$$PoSa = Ps(t)Sa + f_{ko} \quad (5)$$

Here, Pa(t) denotes a current pneumatic pressure in the air cushion 110 determined by the pneumatic pressure sensor 11, Sa denotes the bottom portion area of the air cushion 110, namely, the area of a part where the air cushion 110 including the opening part and the transparent substrate 120 are adjoined and is a constant, Ps(t) denotes air pressure, $f_{ko}$ denotes an initial elastic force element of a material forming the air cushion 110, and Ka(t) denotes a hypothetical elastic element in the cylinder piston model illustrated in FIG. 7B.

In addition, h(t) denotes a hypothetical thickness of the air cushion 110 that varies according to pneumatic pressure Va(t) in the air cushion 110 in the cylinder piston model, Fv(t) denotes the magnitude of the force horizontally applied to the air cushion 110, Po denotes an initial pressure (i.e. initial pneumatic pressure) in the air cushion 1100 measured before the air cushion is pressed.

When Equation (5) is applied to Equation (4), Fv(t) is expressed as the following Equation (6).

$$Fv(t) = (Pa(t) - Po)Sa - Ka(t)h(t) \quad (6)$$

Since it is difficult to directly calculate the hypothetical thickness h(t) of the air cushion 110 with Equation (6), the hypothetical thickness h(t) of the air cushion 110 is indirectly calculated by using a relationship between the bottom portion area Sa and the pneumatic pressure Va(t) in the air cushion 110 like the following Equation (7).

$$h(t) = \frac{Va(t)}{Sa} \quad (7)$$

In addition, the pneumatic pressure Va(t) of Equation (7) in the air cushion 110 is indirectly calculated with Equation (8) using Boyle-Charles' Law.

$$Va(t) = R\frac{Ta(t)}{Pa(t)} \quad (8)$$

$$R = \frac{PoVo}{To}$$

In Equation (8), To denotes an initial temperature value in the air cushion 110 and may be a temperature previously measured by using the temperature sensor 13 before the air cushion 110 operates by an external pressure, Ta(t) denotes a current temperature in the air cushion 110 determined by using the temperature sensor 13, Po is an initial pneumatic pressure in the air cushion 110, and Vo denotes an initial air volume in the air cushion 110.

The force Fv(t) vertically applied to the air cushion 110 is expressed as the following Equation (9) based on Equations (6) to (8).

$$Fv(t) = (Pa(t) - Po)Sa - Ka(t)\frac{R}{Sa}\frac{Ta(t)}{Pa(t)} \quad (9)$$

In Equations (8) and (9), as described above, Pa(t) and Ta(t) are respectively measured with the pneumatic pressure sensor 11 and the temperature sensor 13, and Po, Vo, To and So are also measured.

However, Ka(t) is a parameter varying according to time and is influenced by a stretch force of a material forming the air cushion 110. At this point, the stretch force of the material is influenced by the pneumatic pressure in the air cushion 110 and the area of the contact surface between the pressure applying unit and the top portion of the air cushion 110.

Accordingly, Ka(t) is expressed with a function of the pneumatic pressure Pa(t) in the air cushion 110 and the area Sh(t) of the contact surface with the pressure applying unit as the following Equation (10).

$$Ka(Pa(t), Sh(t)) \quad (10)$$

Consequently, Equation (10) is expressed as the following Equation (11) by using Equation (10) and the force Fv(t) vertically applied to the air cushion 110 is calculated according to Equation (10).

$$Fv(t) = (Pa(t) - Po)Sa - Ka(Pa(t), Sh(t))\frac{R}{Sa}\frac{Ta(t)}{Pa(t)} \quad (11)$$

In Equation (11), Ta(t) denotes a temperature in the air cushion 110 determined with the temperature sensor 13. 't' denotes a time.

Thus, the controller 20 measures the force Fv(t) vertically applied to the air cushion 110 with Equation (11) by using the determined pneumatic pressure, temperature, and area of the contact surface in the air cushion 110.

Then, the controller 20 measures the force Fh(t) horizontally applied to the air cushion 110 (operation S27).

When the force Fh(t) is horizontally applied to the air cushion 110 by a user with his/her hand or the like, change in the air cushion is schematically illustrated in FIG. 8.

As illustrated in FIG. 8, when the force is horizontally applied to the air cushion 110, a position (i.e. position X(t) on the X-axis, position Y(t) on the Y-axis) of the contact part is changed in the vertical direction and also in the horizontal direction. When compared with a previous state, a movement amount ΔY in the horizontal direction and a movement amount ΔY are generated.

The controller calculates the force Fh(t) horizontally applied to the air cushion 110 through the following Equation (12) by using the movement amounts (ΔY, ΔY) determined in the current operation.

$$Fh(t) = a_5 \Delta X(t)^2 a_4 \Delta Y(t)^2 a_3 \Delta X(t) \Delta Y(t) + a_2 \Delta X(t) + a_1 \Delta Y(t) + a_0 \quad (12)$$

Here, a1, a2, a3, a4 and a5 are coefficients determining elasticity of a material forming the air cushion 110, and are constants. At this point, a1, a2, a3, a4, and a5 are calculated with a least-square method and have different values from each other.

Thus, the controller 20 measures the magnitudes of the forces vertically and horizontally applied to the air cushion 110 by being pressed with a finger, and determines directions and magnitudes of the forces applied to the air cushion 110.

A process of operations S11 to S27 is performed at a predetermined time period, and at every predetermined time period, the controller 20 calculates the vertically applied force Fv(t) and the horizontally applied force Fh(t) by obtaining a pneumatic pressure sensing signal from the pneumatic pressure sensor 11, a temperature sensing signal from the temperature sensor 13, and an image captured by the capturing unit 15.

The air cushion 110, with which an application direction and magnitude of the force are determined according to this scheme, may be used as an input device such as a mouse of a computer, an auxiliary device for the input device, or a device for controlling an object such as a robot in a wireless or wired manner.

In other words, a motion direction of an object or a curser of a display device may be determined with an application direction of a force to the air cushion, and a degree of motion may be determined according to a magnitude of the force applied to the determined direction.

Thus, when an operation of the cursor or object is controlled with the air cushion 110, user satisfaction is improved.

In other words, the air cushion 110 is made of a rubber material having soft and elastic feeling, instead of a cold and rigid metal or plastic, and the inside thereof is filled with air.

When the air cushion 110 is used instead of an input device such as a mouse, trackball, or joystick, touch is improved and accordingly the experience of use is improved.

In addition, since a cursor or object is controlled in a desired state only with motion direction and degree of the finger on the air cushion 110 or a pressed degree of the air cushion 110 without an operation for moving or rotating a finger to a desired direction, fine adjustment is possible and user fatigue is greatly reduced.

In addition, when the air cushion is used as a switch for switching on/off states or as a switch for controlling an operation amount, since a precise operation of a desired device is enabled only with a small motion, user fatigue is reduced and accurate control is conducted for a control target.

Therefore, the foregoing embodiments should be regarded as illustrative rather than limiting in all aspects. The scope of the present disclosure is presented by the accompanying claims rather than the foregoing description. It should be understood that all changes or modifications derived from the definitions and scopes of the Claims and their equivalents fall within the scope of the present disclosure.

What is claimed is:

1. An input device for a computer, the input device comprising:
    an air cushion, an inside of which is filled with air, the air cushion having a plurality of patterns arrayed on an inner surface thereof;
    a pneumatic pressure sensor sensing a pneumatic pressure in the air cushion to output a corresponding pneumatic pressure sensing signal;
    a temperature sensor sensing a temperature in the air cushion to output a corresponding temperature sensing signal;
    a capturing unit positioned in a bottom portion of the air cushion, capturing the plurality of patterns, and outputting a pattern image for each captured pattern; and a controller connected to the pneumatic pressure sensing unit, temperature sensing unit, and capturing unit, determining the pneumatic pressure in the air cushion by using the pneumatic sensing signal, determining the temperature in the air cushion by using the temperature sensing signal, comparing the captured pattern image with an initial pattern image to determine an area of a contact surface between the air cushion and a pressure applying unit, which applies pressure to an outer side of the air cushion, and movement amounts in X- and Y-directions, determining a magnitude of a force applied to the air cushion in the Y-direction by using the determined temperature, pneumatic pressure, and area of the contact surface, and determining a magnitude of a force applied to the air cushion in the X-direction by using the determined movement amount of the contact surface, wherein the computer determines a motion direction of an object or a cursor of a display device according to the determined magnitude of the force applied in the Y-direction and the determined magnitude of the force applied in the X-direction.

2. The apparatus of claim 1, wherein the magnitude Fv(t) of the force applied in the Y-direction is calculated with the following equation, $$Fv(t) = (Pa(t) - Po)Sa - Ka(Pa(t), Sh(t))\frac{R}{Sa}\frac{Ta(t)}{Pa(t)}$$

$$R = \frac{PoVo}{To}$$

where Pa(t) denotes the determined pneumatic pressure, Po denotes the initial pneumatic pressure, Sa denotes a bottom portion area of the air cushion, Ka denotes a hypothetical elastic element in a cylinder piston model, Sh(t) denotes the area of the contact surface of the air cushion, and Ta(t) denotes the determined temperature of the air cushion.

3. The apparatus of claim 1, further comprising:
a thermal sensor or contact sensor positioned in the air cushion,
wherein the controller calculates the area of the contact surface by using a signal output from the thermal sensor or the contact sensor.

4. The apparatus of claim 1, wherein the magnitude Fh(t) of the force applied in the X-direction is calculated with the following equation, $$Fh(t) = a_5 DX(t)^2 + a_4 DY(t)^2 + a_3 DX(t)DY(t) + a_2 DX(t) + a_1 DY(t) + a_0$$

where a1, a2, a3, a4, and a5 are coefficients determining elasticity of a material forming the air cushion, and are constants, Δx denotes a movement amount in a horizontal direction, and Δy denotes a movement amount in a vertical direction.

5. The apparatus of claim 4, wherein the controller calculates a position X(t) on an X-coordinate and a position Y(t) on a Y-coordinate of each pattern with the following Equation, $$X(t) = \frac{d}{a(t)}x(t)$$

-continued $$Y(t) = \frac{d}{a(t)}L$$

where d denotes an initial diameter of each pattern, a(t) denotes a magnitude of a major axis on an captured pattern image of each pattern, and L denotes a focal length, calculates an average value of the X-coordinate positions for the plurality of patterns and an average value of the Y-coordinate positions for the plurality of patterns as a current coordinate value of the current contact surface, and calculates a difference between the current coordinate value and a previously calculated coordinate value for the contact surface to calculate the movement amount (ΔX, ΔY) in the X- and Y-directions of the contact surface.

6. A method for controlling an operation of a cursor or object on a display device, the method comprising:
measuring pneumatic pressure in the air cushion;
measuring a temperature in the air cushion;
obtaining a pattern image for each of a plurality of patterns arrayed in the air cushion;
comparing the captured pattern image with an initial pattern image to determine an area of a contact surface between the air cushion and a pressure applying unit, which applies pressure to an outer side of the air cushion, and movement amounts in X- and Y-directions;
determining a magnitude of a force applied to the air cushion in the Y-direction by using the determined temperature, pneumatic pressure, and area of the contact surface;
determining a magnitude of a force applied to the air cushion in the X-direction by using the determined movement amount of the contact surface; and
inputting the determined magnitude of the force applied to the air cushion in the Y-direction and the determined magnitude of the force applied to the air cushion in the X-direction to a computer to control an operation of a cursor or object on the display device.

7. The method of claim 6, wherein determining a magnitude of a force applied to the air cushion in the Y-direction comprises calculating the magnitude Fv(t) of the force applied in the Y-direction with the following equation, $$Fv(t) = (Pa(t) - Po)Sa - Ka(Pa(t), Sh(t))\frac{R}{Sa}\frac{Ta(t)}{Pa(t)}$$

$$R = \frac{PoVo}{To}$$

where Pa(t) denotes the determined pneumatic pressure, Po denotes the initial pneumatic pressure, Sa denotes a bottom portion area of the air cushion, Ka denotes a hypothetical elastic element in a cylinder piston model, Sh(t) denotes the area of the contact surface of the air cushion, and Ta(t) denotes the determined temperature of the air cushion.

8. The method of claim 6, wherein determining a magnitude of a force applied to the air cushion in the X-direction comprises calculating the magnitude Fv(t) of the force applied in the Y-direction with the following equation, $$Fh(t)=a_5DX(t)^2+a_4DY(t)^2+a_3DX(t)DY(t)+a_2DX(t)+a_1DY(t)+a_0$$

where a1, a2, a3, a4, and a5 are coefficients determining elasticity of a material forming the air cushion, and are constants, $\Delta x$ denotes a movement amount in a horizontal direction, and $\Delta y$ denotes a movement amount in a vertical direction.

9. The apparatus of claim 8, wherein determining a magnitude of a force applied to the air cushion in the X-direction further comprises:

calculating a position X(t) on an X-axis coordinate and a position Y(t) on a Y-axis coordinate of each pattern with the following Equation, $$X(t) = \frac{d}{a(t)} x(t)$$

$$Y(t) = \frac{d}{a(t)} L$$

where d denotes an initial diameter of each pattern, a(t) denotes a magnitude of a major axis on an obtained pattern image of each pattern, and L denotes a focal length, calculating an average value of the X-coordinate positions for the plurality of patterns and an average value of the Y-coordinate positions for the plurality of patterns as a current coordinate value of the current contact surface, and calculating a difference between the current coordinate value and a previously calculated coordinate value for the contact surface to calculate the movement amount ($\Delta X$, $\Delta Y$) in the X- and Y-directions of the contact surface.

* * * * *